United States Patent
Waida et al.

(10) Patent No.: US 7,016,535 B2
(45) Date of Patent: Mar. 21, 2006

(54) PATTERN IDENTIFICATION APPARATUS, PATTERN IDENTIFICATION METHOD, AND PATTERN IDENTIFICATION PROGRAM

(75) Inventors: Toshiyuki Waida, Kawasaki (JP); Shinichi Eguchi, Kawasaki (JP); Kouichi Kanamoto, Kawasaki (JP); Maki Yabuki, Kawasaki (JP); Koichi Chiba, Kawasaki (JP); Katsutoshi Kobara, Kawasaki (JP); Osamu Sato, Kawasaki (JP); Kazunori Yamamoto, Kawasaki (JP); Yutaka Katsumata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 699 days.

(21) Appl. No.: 09/987,961

(22) Filed: Nov. 16, 2001

(65) Prior Publication Data

US 2003/0016870 A1    Jan. 23, 2003

(30) Foreign Application Priority Data

Jul. 19, 2001    (JP) .............................. 2001-219096

(51) Int. Cl.
*G06K 9/00*    (2006.01)

(52) U.S. Cl. ........................ 382/181; 382/190; 382/218

(58) Field of Classification Search ........ 382/137–140, 382/159, 165, 202, 209, 218, 305–306, 124, 382/103, 190, 181; 707/6; 715/506, 517

See application file for complete search history.

(56) References Cited

U.S. PATENT DOCUMENTS

| | | | | |
|---|---|---|---|---|
| 5,067,162 A | * | 11/1991 | Driscoll et al. | 382/126 |
| 5,396,588 A | * | 3/1995 | Froessl | 715/542 |
| 5,696,838 A | * | 12/1997 | Chiu et al. | 382/159 |
| 6,327,387 B1 | * | 12/2001 | Naoi et al. | 382/190 |
| 6,477,275 B1 | * | 11/2002 | Melikian et al. | 382/217 |
| 6,493,465 B1 | * | 12/2002 | Mori et al. | 382/209 |
| 6,584,224 B1 | * | 6/2003 | Sun et al. | 382/217 |
| 6,678,427 B1 | * | 1/2004 | Kamimura | 382/306 |
| 6,788,829 B1 | * | 9/2004 | Murakawa et al. | 382/305 |

FOREIGN PATENT DOCUMENTS

| | | |
|---|---|---|
| JP | 07-044682 | 2/1995 |
| JP | 07-249099 | 9/1995 |
| JP | 11-184965 | 7/1999 |
| JP | 11-328311 | 11/1999 |

* cited by examiner

*Primary Examiner*—Daniel Miriam
(74) *Attorney, Agent, or Firm*—Arent Fox PLLC

(57) ABSTRACT

Collation can be carried out at a high speed without reducing the accuracy thereof, whereby processing of identifying documents is accurately performed at a high speed. To this end, characteristic data of a predetermined pattern is registered in advance. Characteristic data in a first area greater than an area of the predetermined pattern registered in advance in an image to be identified is compared and collated with characteristic data of the predetermined pattern. A second area smaller than the first area is cut out from the first area based on the result of comparison, so that characteristic data of an image in the second area is compared and collated with the characteristic data of the predetermined pattern, thus making it possible to identify the predetermined pattern contained in the image based on the result of comparison.

16 Claims, 10 Drawing Sheets

Fig. 7A image data

Fig. 7B buffer for preparation of vertical characteristic data

32 image data for each column

Fig. 8

| unique words | coordinate position | image size | characteristic data | multiple element characteristic data |
|---|---|---|---|---|
| XXXTELECOMMUNICATIONS COMPANY, Ltd | x1,y1 | m1×n1 | horizontal / vertical vector characteristics | multiple element characteristics |
| X X X | x2,y2 | m2×n2 | horizontal / vertical vector characteristics | multiple element characteristics |
| amount of money | x3,y3 | m3×n3 | horizontal / vertical vector characteristics | multiple element characteristics |
| time of payment | x4,y4 | m4×n4 | horizontal / vertical vector characteristics | multiple element characteristics |

PATTERN IDENTIFICATION APPARATUS, PATTERN IDENTIFICATION METHOD, AND PATTERN IDENTIFICATION PROGRAM

BACKGROUND OF THE INVENTION

1. Field of the Invention

The present invention relates to a pattern identification apparatus, a pattern identification method, and a the pattern identification program in which a predetermined image is compared and collated with a predetermined pattern such as an image stored in advance to identify a predetermined pattern contained in the predetermined image. More specifically, the present invention relates to a pattern identification apparatus, a pattern identification method, and a pattern identification program capable of identifying documents, slits and the like by comparing and collating images of a variety of kinds of them with specific registered images.

2. Description of the Related Art

The payments or transfers of electricity bills, gas bills, municipal taxes (taxes, public funds), etc., are processed by using the data (the amounts of money for payments, the times for payments, etc.) described in a variety of tax documents, public fund documents and so on in banks, post offices, etc. Today, it is rare for operators to process such data described in the documents, slits, etc., by manually inputting them to machines, computers and so on, and it is becoming common to analyze and process data by using an automatic reading system which can automatically read data by means of a scanner, an optical character reader or the like.

In such a system, in order to accurately analyze the data described in a document, it is first necessary to identify the document, which is an object to be processed. For instance, there is a DP collation technique as a typical one of document identification methods. The DP collation technique is a method of comparing and collating an image of a document (i.e., image to be searched), which has been read by an image reading means such as, for example, a scanner, with a registered image while moving an image area (search area) of the document image having the same size as that of the registered image little by little relative to the registered image, thereby to search for an image of the document which matches the registered image.

Figure 16:
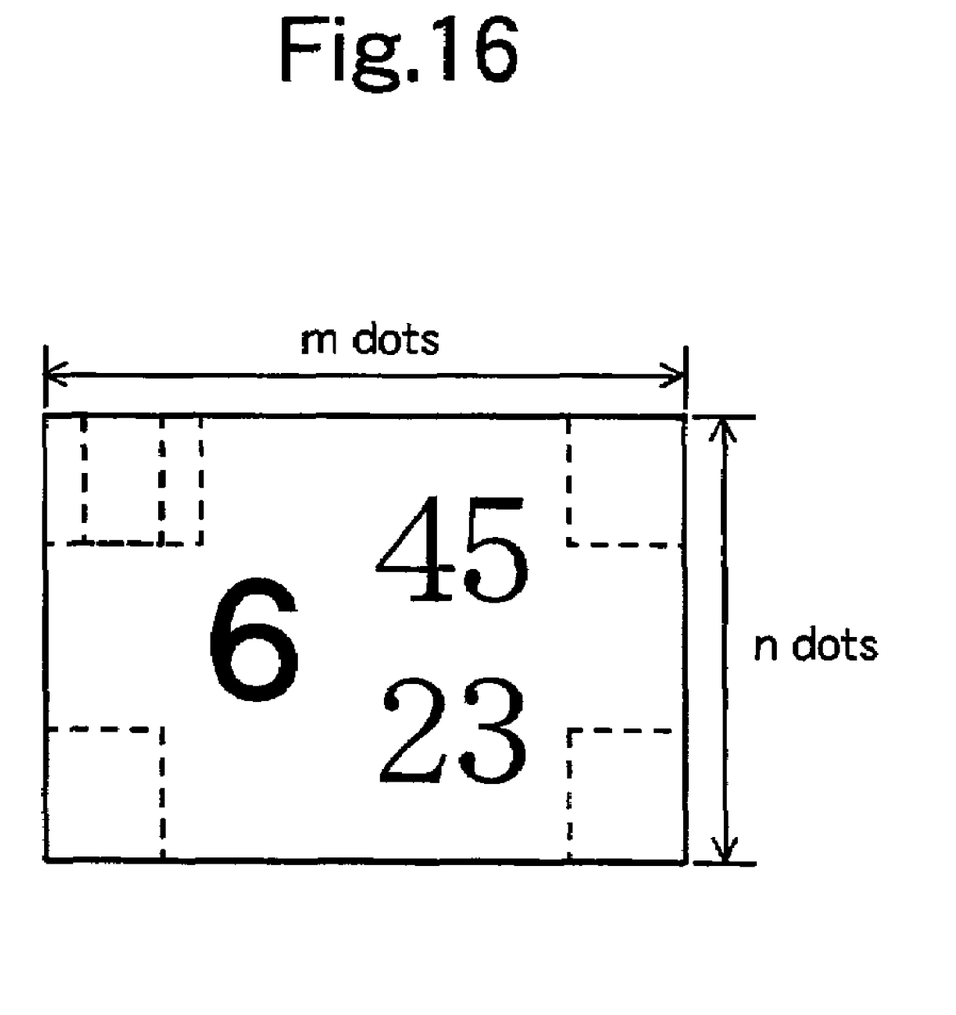
FIG. 16 is a view schematically illustrating a DP collation method.

FIG. 16 is a view schematically illustrating the DP collation method. As illustrated in this figure, in case where the search image comprises m dots in an X axis direction and n dots in a Y axis direction, when the DP collation method is used, collation is carried out by sequentially shifting the search area dot by dot from an upper left corner to the right and then downward line by line, thus requiring (m×n) times of searching operations. In this case, it is usual to set the search area to a wider area than the size of the registered image in consideration of displacements of the image occurring when read by a scanner. However, this search processing deals with a large mount of data and the number of search operations is also great, thus making it difficult to perform the processing at a high speed. Thus, it is considered that for the purpose of speeding up such processing, the number of data to be used and the number of processing operations are reduced by extracting characteristic portions of the registered image, thereby shortening the processing time.

However, in cases where a registered image is included in a part of the search image when search processing is carried out by using a characteristic portion of the registered image as referred to above, it is necessary to provide some margins to the area of the registered image in the search image, and perform the processing of searching for the registered image in that area while taking account of displacements caused at the time of reading the search image, etc. However, conspicuity or remarkableness of the characteristic portion of the registered image is weakened by these margins so that accuracy in the pattern recognition might be reduced, causing errors in the collation result. As a consequence, there arises a problem that reliability in the collation result is reduced.

SUMMARY OF THE INVENTION

The present invention has been made in view of the circumstances as referred to above, and has for its object to provide a pattern identification apparatus, a pattern identification method, and a pattern identification program which are capable of performing collation at a high speed without reducing the accuracy of collation in pattern identification by adopting a feedback-type collation method in which collation is first carried out with a search area added by margins to provide a size wider than that of a registered image, and then collation is again performed by deleting the margins based on the result of the first collation.

Bearing the above object in mind, according to one aspect of the present invention, there is provided a pattern identification apparatus for identifying a predetermined pattern contained in an image, the apparatus comprising: a storage section in which data related to the predetermined pattern is stored; a first collation section for making comparison and collation between data related to an image in a first area greater than an area of the predetermined pattern in the image and the data related to the predetermined pattern; a cutting section for cutting out a second area smaller than the first area from the first area based on the result of comparison carried out by the first collation section; a second collation section for making comparison and collation between data related to an image in the second area and the data related to the predetermined pattern; and an identification section for identifying the predetermined pattern contained in the image based on the result of comparison carried out by the second collation section.

Based on the result of comparison and collation obtained by the first collation section, the second collation section again performs comparison and collation using an image cut out in a size smaller than the size of the image used in the first collation section. Thus, even when a characteristic portion of the image is used for identification for example, noise (garbage) included in margins of the image can be removed, whereby it is possible to perform collation at a high speed and with high accuracy and improve reliability in operation as well. In an embodiment of the present invention, the storage section is constituted by a layout data base (DB), and the first and second collation sections, the cutting section and the identification section are constituted by a collation section and a control section.

In a preferred form of the present invention, the first collation section carries out comparison and collation while shifting the predetermined pattern relative to the image in the first area one unit area by one unit area which constitutes data related to the image, thereby to calculate a difference level between the image in the first area and the predetermined pattern, and the cutting section cuts out the second area based on an amount of shift of the predetermined pattern relative to the image in the first area at the time when the difference level meets a predetermined requirement.

With such an arrangement, as the result of the collation (first collation) carried out by the first collation section, there are provided minimum points at which the difference level becomes a local minimum for instance, and the second collation section again performs collation using the local minimum points whereby the margins can be deleted accurately from the image used in the first collation. Accordingly, the second collation section can perform second collation with an extremely high degree of accuracy.

According to another aspect of the present invention, there is provided a pattern identification apparatus for identifying a predetermined pattern contained in an image, the apparatus comprising: a storage section in which data related to the predetermined pattern is stored; a first cutting section for cutting out a first area greater than the predetermined pattern area from the image; a first collation section for making comparison and collation between data related to an image in the first area and the data related to the predetermined pattern; a second cutting section for cutting out a second area smaller than the first area from the first area based on the result of comparison carried out by the first collation section; a second collation section for making comparison and collation between data related to an image in the second area and the data related to the predetermined pattern; and an identification section for identifying the predetermined pattern contained in the image based on the result of comparison carried out by the second collation section.

In this manner, the first collation section performs comparison and collation using an image cut out in a size wider than the registered pattern, and based on the result of comparison thus obtained by the first collation section, the second collation section again performs comparison and collation using an image cut out in a size smaller than that of the image used in the first collation section. Thus, problems such as displacements of coordinates occurring when an image, which is an object to be identified, is read in, are obviated, thereby improving the accuracy in the image collation. As a result, misidentification can be reduced to a substantial extent. In an embodiment of the present invention, the storage section is constituted by a layout data base (DB) as in the above case, and the first and second collation sections, the first and second cutting sections and the identification section are constituted by a collation section and a control section.

According to a further aspect of the present invention, there is provided a pattern identification method for identifying a predetermined pattern contained in an image, the method comprising: a first step for registering data related to the predetermined pattern in advance; a second step for making comparison and collation between data related to the image in a first area greater than an area of the predetermined pattern in the image and the data related to the predetermined pattern; a third step for cutting out a second area smaller than the first area from the first area based on the result of comparison carried out in the second step; a fourth step for making comparison and collation between data related to an image in the second area and the data related to the predetermined pattern; and a fifth step for identifying the predetermined pattern contained in the image based on the result of comparison carried out in the fourth step.

With this method, it is possible to improve the accuracy in collation in the case of documents being identified, thus reducing misidentification of the documents to a considerable extent.

Moreover, the present invention provides a pattern identification program for making a computer execute the above-mentioned pattern identification method. If such a program is stored in the computer, the collation accuracy can be improved in the processing of identifying documents, slits and so on.

The above and other objects, features and advantages of the present invention will become more readily apparent to those skilled in the art from the following detailed description of a preferred embodiment of the present invention taken in conjunction with the accompanying drawings.

DESCRIPTION OF THE PREFERRED EMBODIMENT

Now, a preferred embodiment of the present invention will be described in detail while referring to the accompanying drawings.

Figure 1:
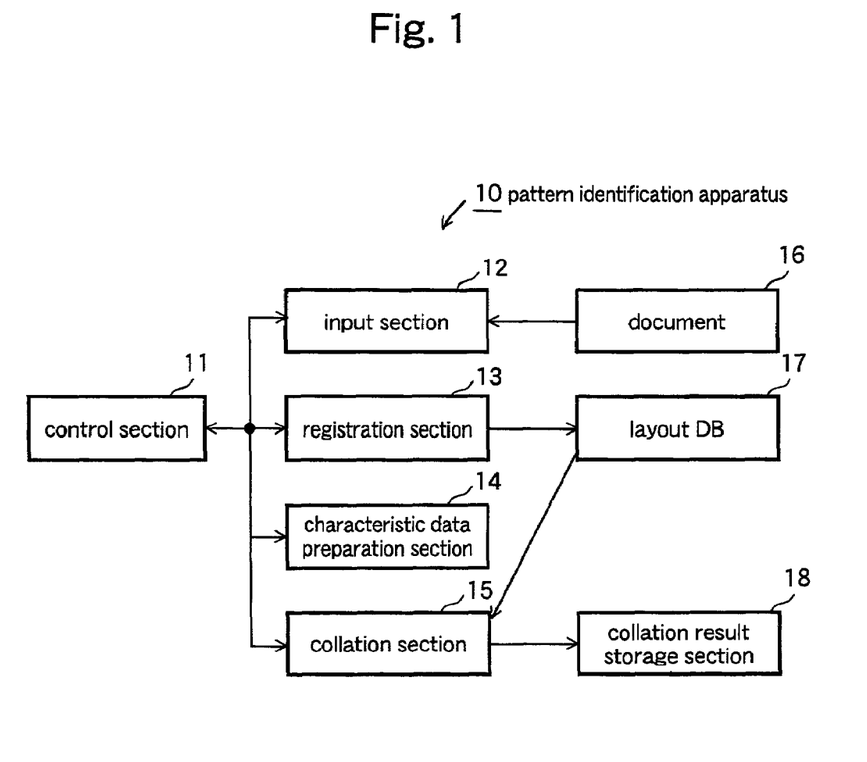
FIG. 1 is a block diagram illustrating the basic construction of a pattern identification apparatus according to one embodiment of the present invention.

FIG. 1 is a block diagram schematically illustrating the basic construction of a pattern identification apparatus according to an embodiment of the present invention. As shown in this figure, a pattern identification apparatus, generally designated at reference numeral 10, includes an input section 12 for reading characters, images and the like printed on a variety of slits or documents 16, a registration section 13 for registering a variety of pieces of information on the documents input by the input section 12 into a layout data base (DB) 17, a characteristic data preparation section 14 for preparing characteristic data to be described later in detail from the images on the document input to the input section 12, a collation section 15 for performing comparison and collation between a registered image in the layout DB 17 and a search image as an object to be collated and for outputting the result of collation or identification to a collation result storage section 18, and a control section 11 for controlling the functions of the above-mentioned respective sections.

Figure 2:
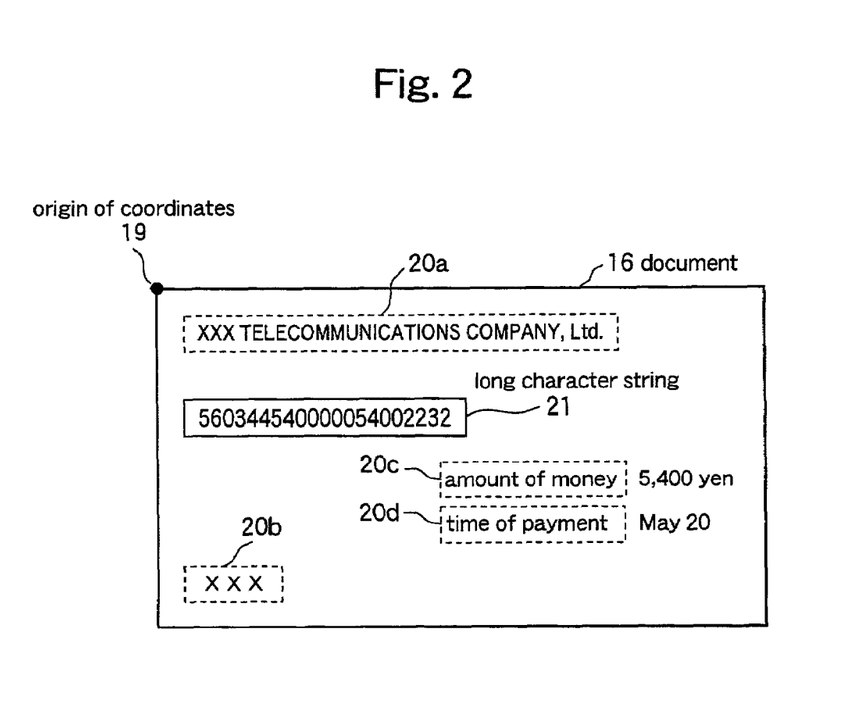
FIG. 2 is one example of a document to be identified.

Specifically, the input section 12 comprises digital equipment such as a scanner, a digital camera, etc., which captures the images on the document 16, as depicted in FIG. 2 for instance, into the pattern identification apparatus 10. In FIG. 2, there are illustrated a long character string 21 used in a preceding stage prior to document identification for narrowing the type of the document 16 to some extent and unique marks or character strings 20a, 20b, 20c and 20d which can also be used in the preceding stage as registered images for identifying the document 16. The upper left corner of the document 16 is assumed to be the origin of coordinates 19 in order to decide the coordinate positions of these registered images 20a, 20b, 20c and 20d, respectively. In this embodiment, the input section 12 is used in both cases when images on a document are input for registration into the layout DB 17 as unique patterns and when images on a document to be identified are input.

Figure 3:
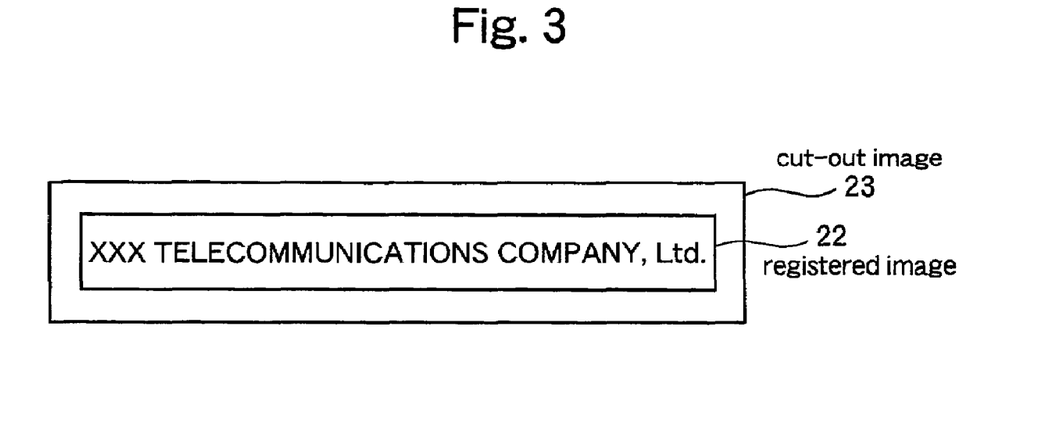
FIG. 3 illustrates examples of a registered image and a cut-out image with margins added to the registered image.

FIG. 3 illustrates one example of a registered image. In this case, when a character string "XXX TELECOMMUNICATIONS COMAPANY, Ltd." in a document is input to the input section 12, the registration section 13 registers predetermined information from the input data into the layout DB 17 as data of a registered image 22. In this embodiment, the collation section 15 carries out comparison and collation between the registered image 22 and an input image (cut-out image 23) in an area equal to the area of the registered image 22 added by constant margins. Based on the result of the comparison and collation, there is formed a search image with the margins removed or deleted from the input image, which is again compared and collated with the registered image 22 thereby to identify the document.

In this manner, by repeating collation through feeding back the result of comparison and collation carried out for the first time, it is successively determined whether subsequent input images to be identified matches the registered image, whereby the document is finally or fixedly determined. In addition, the image thus obtained through such collation may be verified for determination of matching by multiple characteristic collation processing (final image collation), thus finally or fixedly determining the document. In this embodiment, on the assumption that the multiple characteristic collation processing is performed, when matching of the images is confirmed as the result of collation, matching coordinates are set so as to allow the control process to proceed to the following multiple characteristic collation processing step. However, the multiple characteristic collation processing is not an intended aim of the present invention, and hence a description thereof is omitted here. However, it is needless to say that the document may be finally or fixedly determined only by means of the collation processing according to the present invention without performing the multiple characteristic collation processing, as described above.

Figure 4:
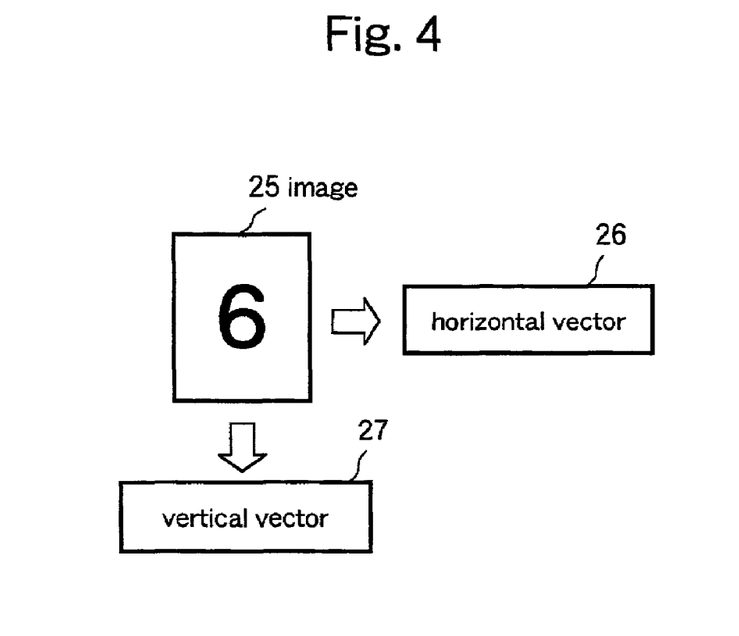
FIG. 4 is a view illustrating a horizontal vector and a vertical vector with respect to an image.

Moreover, in the present invention, the data used for the comparison and collation is neither the registered image nor the search image itself, but data (i.e., characteristic data to be described later) representative of the characteristics of a horizontal vector 26 and a vertical vector 27 of an image 25, as illustrated in FIG. 4. The use of the characteristic data serves to improve the collation speed. Therefore, the data registered in the layout DB 17 includes the characteristic data of the registered image 22. Hereinafter, reference will be made in detail to registration processing to the layout DB 17 when a character "6" in the image 25 as illustrated in FIG. 4 is input to the input section 12 as a registered image, while including details of preparation of the characteristic data.

Figure 5:
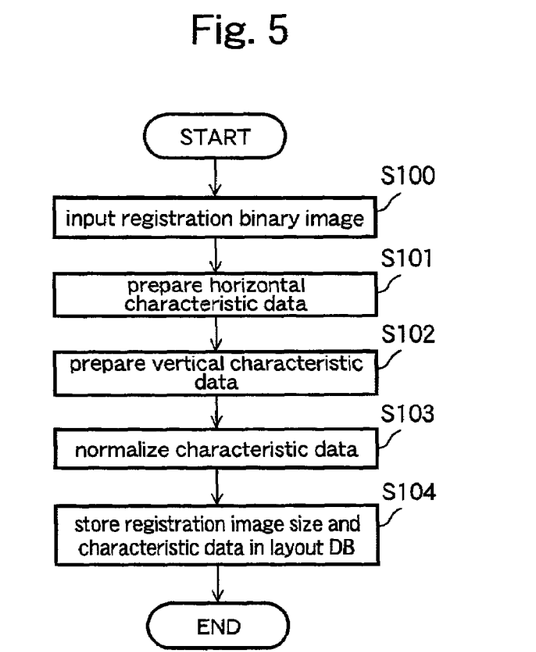
FIG. 5 is a flow chart illustrating an image registration processing flow.
Figure 6:
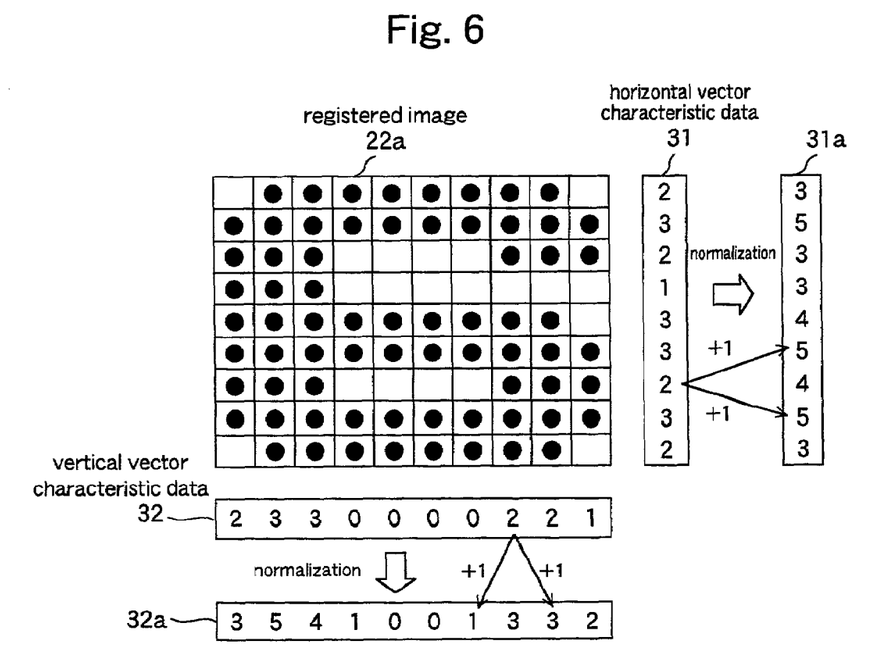
FIG. 6 is a view illustrating a method of preparing characteristic data of an input image (registered image).

FIG. 5 is a flow chart illustrating an image registration processing flow. First of all, a registered image in the form of a monochrome (black and while) binary image of "0" or "1" is input to the input section 12 (S100). Then, the characteristic data preparation section 14 prepares horizontal characteristic data from the input image (S101). FIG. 6 illustrates a method of preparing the characteristic data of the input image (registered image 22a). In this embodiment, the number of black pixel components each consisting of three consecutive dots per line is calculated, and the result of this calculation for each line is assumed to be characteristic data of each line. As shown in FIG. 6, there are eight consecutive black pixels lying on the first horizontal line, so two sets of three consecutive dots are formed, and hence horizontal vector characteristic data 31 on the first line becomes "2". Similarly, there are ten consecutive black pixels on the second horizontal line, and hence horizontal vector characteristic data 31 on the second line becomes "3". Thereafter, characteristic data of a horizontal vector for each of the remaining lines is calculated in the same way, so that there is obtained a set of horizontal vector characteristic data 31 consisting of "232133232", as shown in FIG. 6.

Subsequently, the characteristic data in the vertical direction is prepared (S102). In the vertical direction, too, the number of black pixel components consisting of three consecutive dots per column is calculated in the same manner as in the horizontal direction, to provide the vertical characteristic data for each column. As shown in FIG. 6, there are seven black pixels lying on the first vertical column, and hence vertical vector characteristic data 32 on the first column becomes "3". Similarly, the vertical vector characteristic data on all the remaining columns are calculated in the same way, so that there is obtained a set of vertical vector characteristic data 32 consisting of "2330000221", as shown in FIG. 6.

Since the characteristic data of the binary image as obtained in the above manner includes a quantizing error (a variation upon reading of an image), normalization thereof is carried out (S103). In this embodiment, normalization is concretely performed by distributing a 50% of the black pixel components in the characteristic data to the lines or the columns on the opposite sides thereof. In the case of a horizontal vector, "1", which is a 50 % of the characteristic data "2" on the seventh line, as illustrated in FIG. 6 for instance, is added to the sixth line and the eight line, respectively, on the opposite sides thereof. Here, note that the fraction part below the decimal point, if any, of the 50% of the characteristic data is rounded down. Therefore, when normalized, the characteristic data "3" on the sixth line for instance is added by "1" from both the fifth line and the seventh line, respectively, thus making "5". Similarly, normalization is carried out for all the lines. Moreover, the vertical characteristic data are normalized in the same way. Thus, normalized horizontal vector characteristic data 31a and normalized vertical vector characteristic data 32a are obtained.

Figures 7A, 7B:
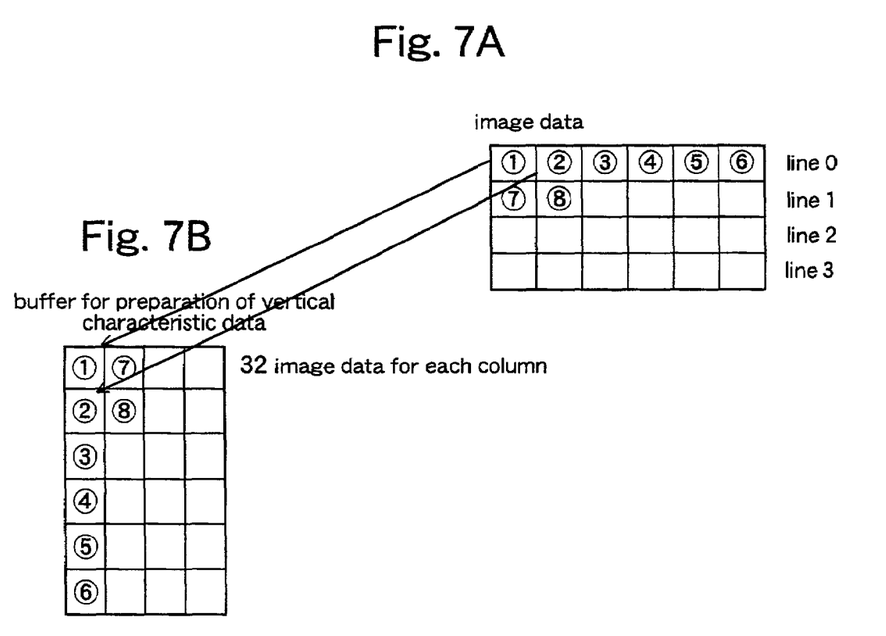
FIGS. 7A and 7B illustrate a concrete method of processing in which an image data buffer is refilled for preparation of vertical characteristic data while preparing horizontal characteristic data, and the characteristic data are calculated with every four bytes being processed at a time.

Here, note that in this embodiment, the processing time is shortened by processing the binary image in groups of four bytes to obtain the characteristic data. In addition, the image data buffer is refilled for preparation of vertical characteristic data while preparing horizontal characteristic data, whereby preparation of the vertical characteristic data is facilitated, thus further shortening the processing time. FIGS. 7A and 7B illustrate such processing concretely. FIG. 7A depicts the state of image data as it is. When looking at the data in the horizontal direction, horizontal characteristic data can be easily calculated by simply looking at the horizontal data in the order of their memory addresses, as shown in 7A. However, when looking at the data in the vertical direction, it is necessary to proceed with their memory addresses in a discontinuous or discrete manner. Accordingly, a separate buffer is provided for preparation of vertical characteristic data, and the processing of refilling data in the vertical direction is carried out while performing the preparation of characteristic data in the horizontal direction as illustrated in FIG. 7B. When the processing of preparing the vertical characteristic data is carried out, it is possible to perform the processing with ease by looking at the buffer for preparation of the vertical characteristic data in the order of their memory addresses.

Moreover, the preparation of the horizontal characteristic data is successively carried out by four bytes (i.e., 32 bits) at a time, as shown in FIG. 7A. The refilling into the buffer for preparation of the vertical characteristic data is carried out by taking out data from the buffer by four bytes in a lump. In addition, by using the buffer for preparation of the vertical characteristic data formed in this manner, the characteristic data in the vertical direction are processed by four bytes at a time as in the case of the horizontal characteristic data. Preparing the characteristic data in this manner serves to expedite the processing and reduce the processing time as well.

Figure 8:
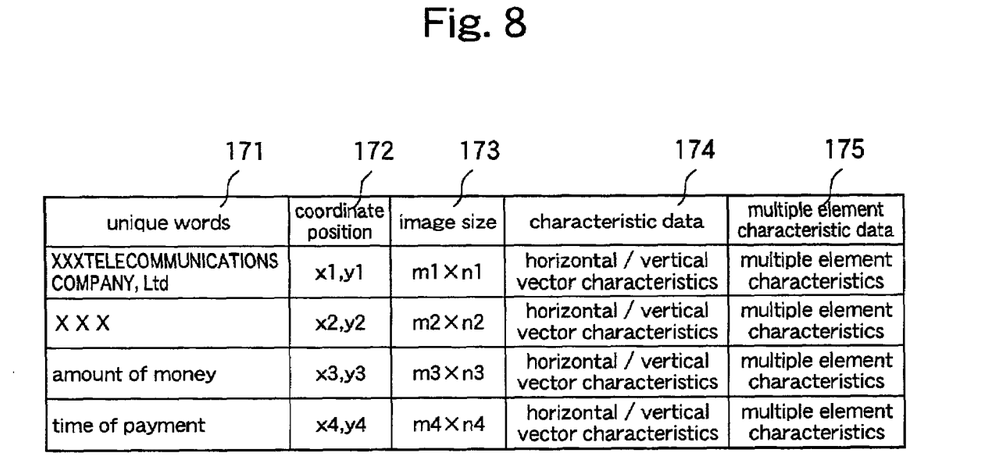
FIG. 8 is a concrete example of the storage condition of a layout data base (DB).

The characteristic data of the registered image obtained in this manner are stored in the layout DB 17 by means of the registration section 13 along with their coordinates and image sizes (S104). FIG. 8 concretely illustrates the storage condition of the layout DB 17 for each registered image of the document illustrated in FIG. 2. A coordinate position 172, image size 173, characteristic data 174, and multiple element characteristic data 175 of a unique word or words (registered image) 171 are stored as data. The multiple element characteristic data 175 is not used in the present invention.

Figure 9:
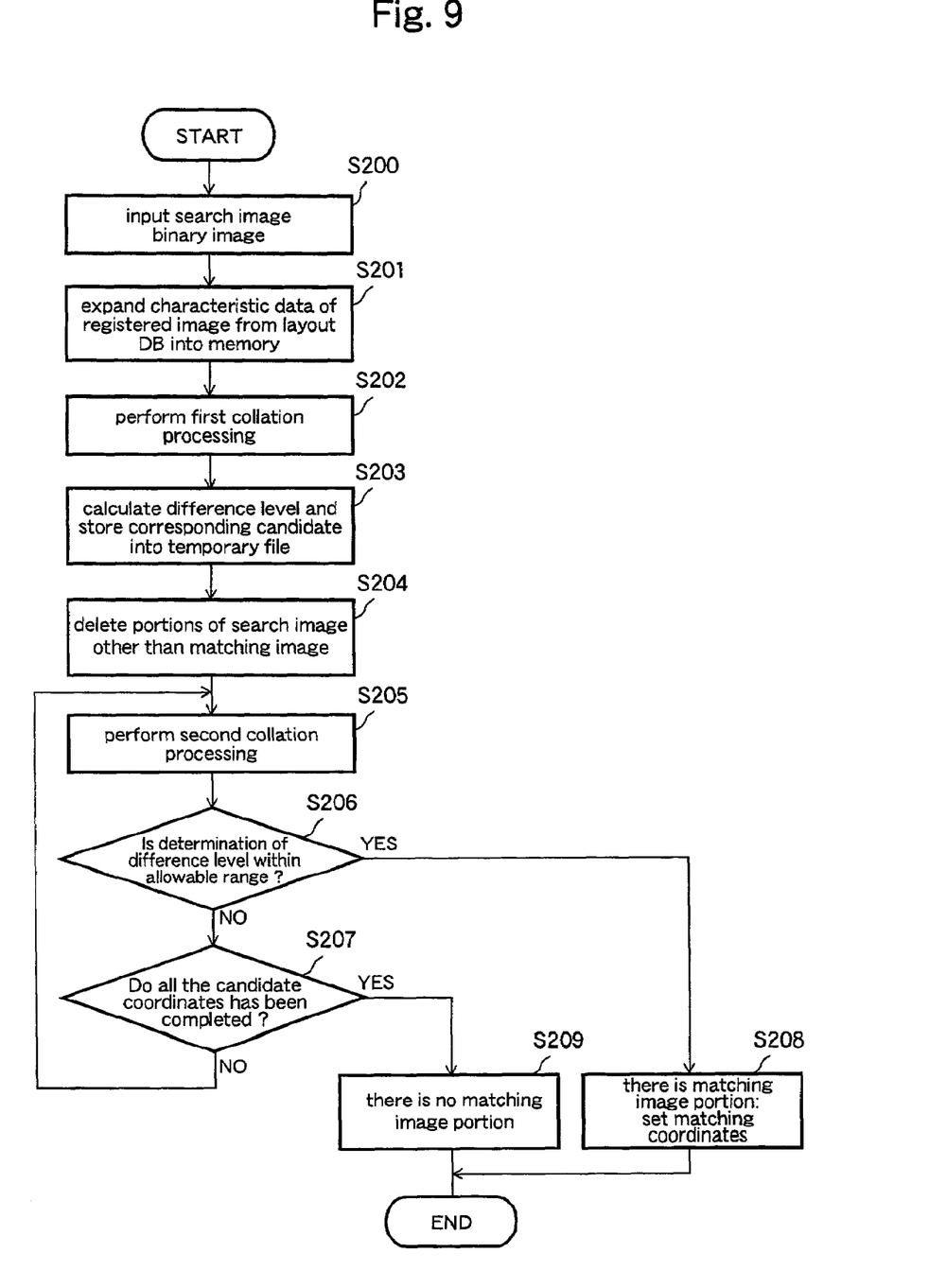
FIG. 9 is a flow chart schematically illustrating image collation processing.

Next, the collation processing carried out by the collation section 15 will be described below in detail. FIG. 9 is a flow chart schematically illustrating the image collation processing. First, the binary data of an image (search image) to be identified is input to the input section 12 (S200). Prior to the start of the collation processing according to the present invention, candidate documents have been roughly selected by means of the long character string 21 illustrated in FIG. 2, but a description of such selection processing is omitted here. Then, the characteristic data of the registered image is expanded from the layout DB 17 into the memory (S201). Here, first collation processing is performed by the collation section 15 (S202). In this collation processing, collation is carried out by using the cut-out image 23 in an area formed by addition of constant margins to the area of the registered image 22 as illustrated in FIG. 3.

Figure 10:
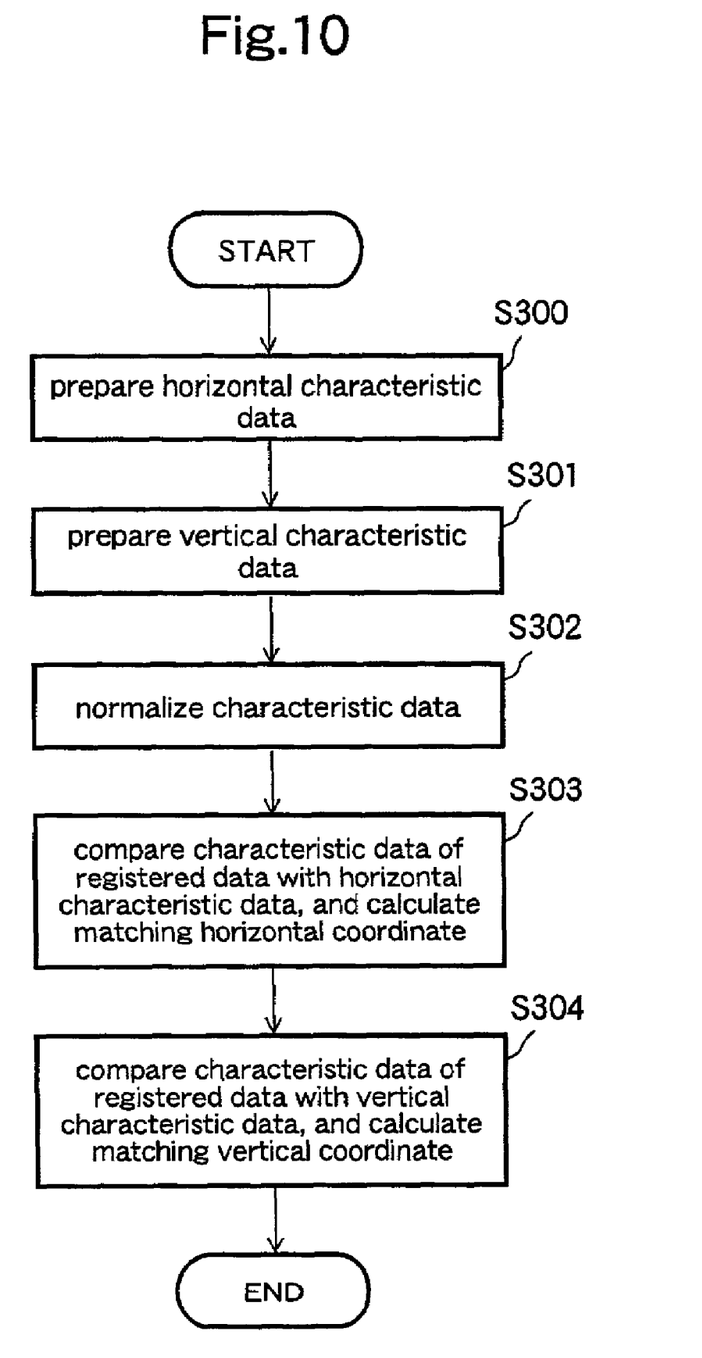
FIG. 10 is a detailed flow chart illustrating first collation processing and second collation processing.

FIG. 10 is a detailed flow chart of the first collation processing in S202. In FIG. 10, first of all, the horizontal characteristic data of the search image is prepared (S300). Then, the vertical characteristic data is prepared (S301). In addition, the characteristic data thus prepared are normalized (S302). The processing of preparing such characteristic data is performed by the characteristic data preparation section 14 as in the processing of preparing the characteristic data of the registered image described above. Here, note that these characteristic data are the characteristic data of an image which is formed by adding a constant margin to the top and bottom sides and the right and left sides, respectively, of an image area which is considered as corresponding to the registered image. The margins to be added may be a certain rate of the size of the registered image or may be a prescribed size.

Figure 11A:
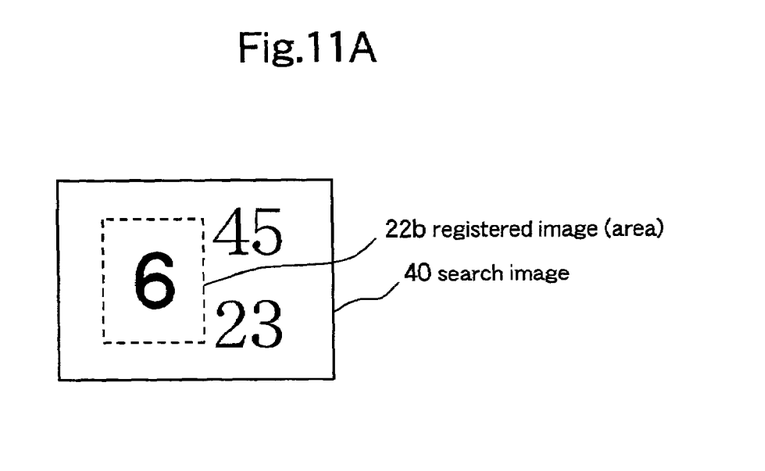
FIGS. 11A, 11B and 11C illustrate a method of comparison and collation between the characteristic data of a registered image and the characteristic data of a search image.
Figure 11B:
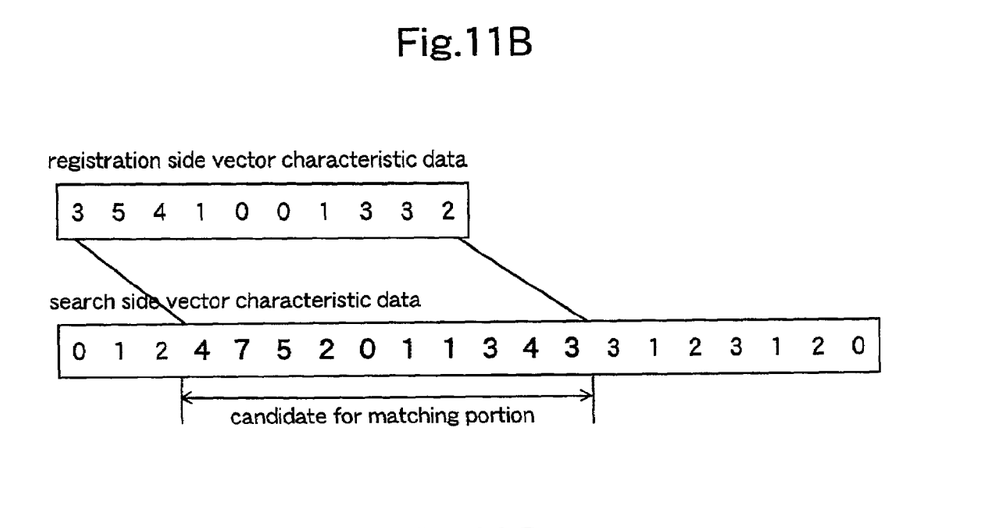
Figure 11C:
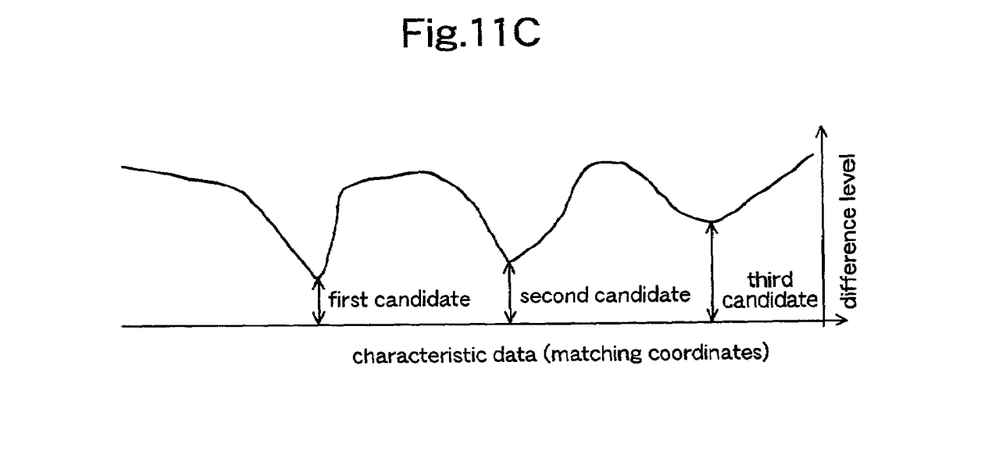

Subsequently, the horizontal vector characteristic data of the registered image and the horizontal vector characteristic data of the search image are compared and collated with each other (S303). A method of this processing is illustrated in FIGS. 11A and 11B in detail. FIG. 11A is a view illustrating the relation of a registered image (area) 22b and a search image 40 added by margins. FIG. 11B is a view illustrating a process in which the vector characteristic data of this search image 40 is compared with the vector characteristic data of the registered image 22b while sequentially moving or shifting the vector characteristic data of the search image 40 from the head one by one. In these figures, first of all, a 10-digit series "0124752011" of the characteristic data of the search side is compared with the characteristic data "3541001332" of the registration side so that a difference therebetween for each corresponding digit is totaled or summed up to provide a difference level. Here, the total sum of differences or the difference level becomes 31={3+4+2+3+7+5+1+3+2+1}. Subsequently, the head or top of the characteristic data of the search side is shifted by one, resulting in a 10-digit series "1247520113", which is compared with the characteristic data "3541001332" of the registration data. In this case, the difference level becomes 24. By sequentially calculating the difference levels in this manner, there is obtained a graph as shown in FIG. 7C.

There are a plurality of local minimum points in this graph, which are then made candidates for collation in second or subsequent collation processing. In this embodiment, the collation section 15 serves to verify how many times the difference levels continuously decrease not less than a prescribed number of times or how many times the difference levels continuously increase not less than a prescribed number of times. As long as there is no large variation in the difference levels, there is no local minimum point enumerated as a candidate. A parameter, i.e., the prescribed number of times used for verification of continuous occurrences, may be set by the user or may be a prescribed value which is determined in advance.

Figure 12:
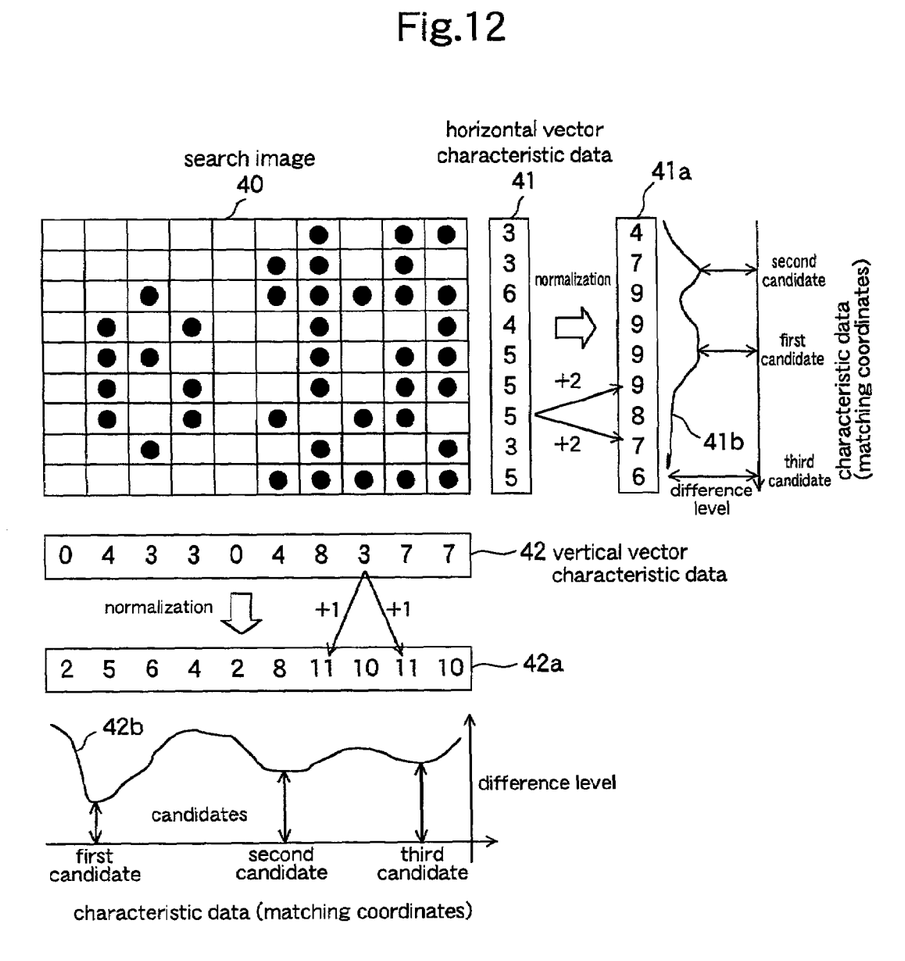
FIG. 12 is a view concretely illustrating the first collation processing.

Next, comparison and collation are carried out for the vertical vectors as in the case of the horizontal vectors described above (S304). Thus, the difference levels are calculated in this manner, and appropriate candidates (matching points) are searched for from a graph as obtained in the above-mentioned manner. The respective candidates obtained as the result of these searches are stored in a temporary file (i.e., the collation result storage section 18 in this embodiment) (S203 in FIG. 9). FIG. 12 is a view concretely illustrating such comparison and collation of the characteristic data of the horizontal and vertical vectors. In FIG. 12, characteristic data 41a, which is obtained by normalizing the horizontal vector characteristic data 41 of the search image 40, is compared with the horizontal vector characteristic data of the registered image 22b to provide a difference level graph 41b. Similarly, characteristic data 42a, which is obtained by normalizing the vertical vector characteristic data 42 of the search image 40, is compared with the vertical vector characteristic data of the registered image 22b to provide a difference level graph 42b.

Figure 13A:
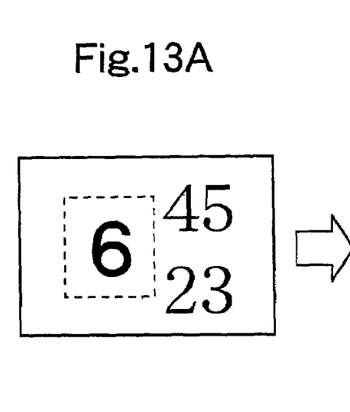
FIGS. 13A and 13B illustrate a concrete example in which margins are deleted from a search image having the margins.
Figure 13B:
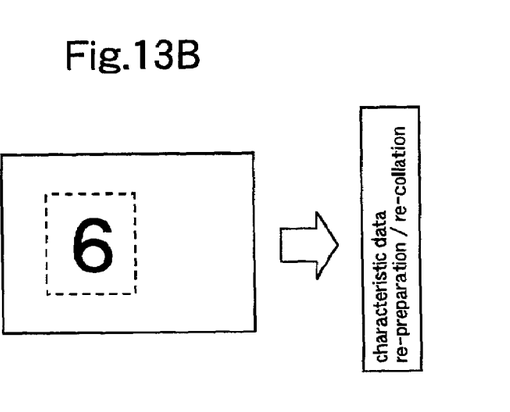

Since the collation processing uses the characteristic data added by the margins, however, patterns (garbage) in the margins other than the patterns intended to be compared and collated would affect the collation processing such that the difference levels might rise in the matching points, or different or inappropriate candidates might be enumerated. For this reason, as illustrated in FIGS. 13A and 13B, images in the margins are deleted or erased from the search image 40 (FIG. 13A) having the margins (portions other than the matching image) to provide a margin deleted image, as shown in FIG. 13B. The characteristic data is prepared again with the marginal images thus deleted, and then subjected to the collation processing (S205). The deletion of the margin or marginal images is carried out by a method such as replacing all the values except those in that portion of the image expanded in the memory which corresponds to the registered image area with white pixels of "0s".

Figure 14:
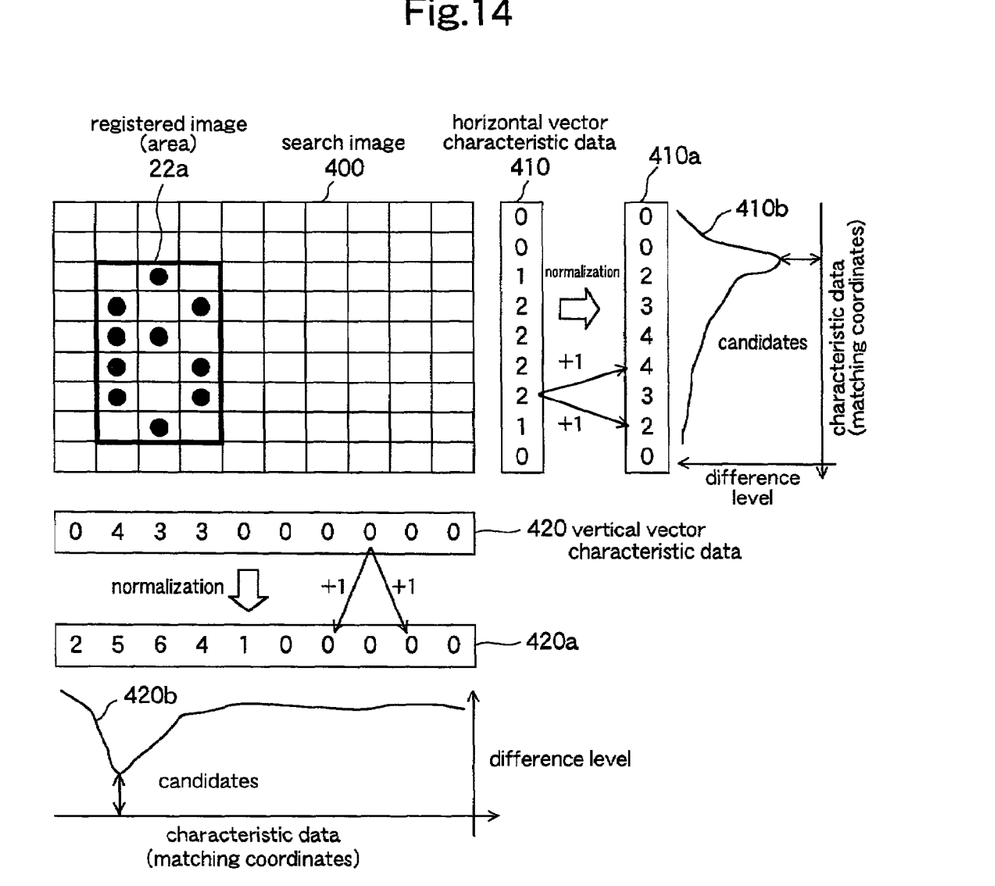
FIG. 14 is a view concretely illustrating the second collation processing.

The second collation processing is performed in accordance with the flow chart of FIG. 10 as in the case of the first collation processing. However, in the second collation processing, only the candidates stored in the collation result storage section 18 are subjected to the collation processing. FIG. 14 is a view concretely illustrating the second collation processing. In FIG. 14, characteristic data 410$a$, which is obtained by normalizing the horizontal vector characteristic data 410 of a search image 400 of which margins are deleted, is compared with the horizontal vector characteristic data of the registered image 22$b$ to provide a difference level graph 410$b$. Similarly, characteristic data 420$a$, which is obtained by normalizing the vertical vector characteristic data 420 of the search image 400 of which margins are deleted, is compared with the vertical vector characteristic data of the registered image 22$b$ to provide a difference level graph 420$b$.

Figure 15:
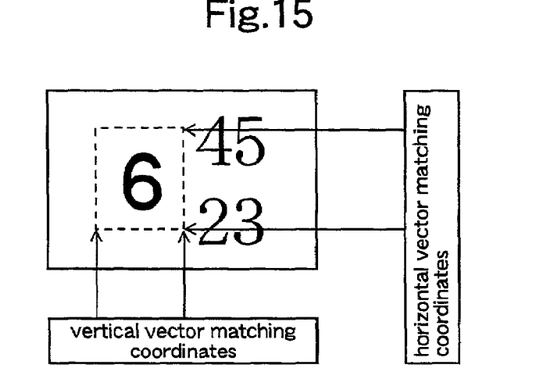
FIG. 15 illustrates an example of setting matching coordinates when there is a match between images according to the collation processing.

Subsequently, difference levels are verified (S206 in FIG. 9). Here, note that the verification is carried out by comparing the difference level calculated by the first collation processing and the difference level calculated by the second collation processing. The difference level goes up when the candidate is a matching point, whereas the difference level falls or remains unchanged when the candidate is not a matching point. Thus, it is possible to perform accurate determination. When the difference level is within an allowable range, that is, when the difference level is lower than a predetermined threshold (YES in S206), it is determined that there is a portion containing a matching image, and the candidate is set as matching coordinates, as illustrated in FIG. 15 (S208), and the processing is ended. Here, note that the threshold can be set by the user. On the other hand, when the difference level is not within the allowable range (NO in S206), it is confirmed whether the verification of all the candidates has been completed (S207). When there still remains any candidate unverified (NO in S207), the following candidate is subjected to the second collation processing of S205 and then verified. However, when there remains no candidate unverified (YES in S207), it is determined that there is no portion containing a matching image (S209), and the processing is ended.

In case where it is determined that there is no portion containing a matching image in this manner, one can recognize that the search image is quite different from the registered image. Therefore, when multiple characteristic collation processing is performed after the above processing, incorrect or wrong documents are prevented from being passed to the multiple characteristic collation processing, thus avoiding waste. Moreover, even in case where documents are finally or fixedly recognized only by the processing of the present invention (i.e., without using the multiple characteristic collation processing), incorrect or wrong recognition of documents can be excluded, thus making it possible to carry out accurate recognition of the documents. As a result, it is possible to perform processing smoothly according to the information described in the documents.

Although an embodiment of the present invention has been shown and described herein, the present invention is not limited to the above-mentioned embodiment, but can of course be modified, changed or applied to such an extent as not departing from the spirit and scope of the invention.

As described in the foregoing, according to the present invention, when an image of a document or the like, which is an object to be identified, is compared and collated with a pattern which has been registered in advance so as to identify the document, the area of the pattern is set to be wider than the area of the registered pattern such as by adding margins to the pattern area of the image to be identified. Then, a size of the registered image is cut out so as to delete the margins based on the result of the comparison and collation, so that collation is again carried out. Thus, by employing such a two-stage feedback type collation method, in case where collation is performed using characteristic data of the document, accuracy in the collation can be improved, thus permitting erroneous document identification to be excluded. In addition, for the image to be compared and collated, the data of the image itself may be used, but when the collation of an image as illustrated in FIG. 16 for instance is performed, M×N times of collations are required according to the DP collation method, but the use of respective simple horizontal and vertical characteristic data (black pixels) only needs M+N times of collations, thus making it possible to speed up the collations. As a result, the identification processing can be sped up without reducing identification accuracy.

What is claimed is:

1. A pattern identification apparatus for identifying a predetermined pattern contained in an image, said apparatus comprising:

a storage section in which data related to said predetermined pattern is stored;

a first collation section for making comparison and collation between data related to an image in a first area greater than an area of said predetermined pattern in said image and said data related to said predetermined pattern;

a cutting section for cutting out a second area smaller than said first area from said first area based on the result of comparison carried out by said first collation section;

a second collation section for making comparison and collation between data related to an image in said second area and said data related to said predetermined pattern; and an identification section for identifying said predetermined pattern contained in said image based on the result of comparison carried out by said second collation section, wherein said first collation section carries out comparison and collation while shifting said predetermined pattern relative to said image in said first area one unit area by one unit area which constitutes data related to said image, thereby to calculate a difference level between said image in said first area and said predetermined pattern, and said cutting section cuts out said second area based on an amount of shift of said predetermined pattern relative to said image in said first area at the time when said difference level meets a predetermined requirement.

2. The pattern identification apparatus according to claim 1, wherein said storage section stores a plurality of kinds of different patterns as patterns to be identified.

3. The pattern identification apparatus according to claim 2, wherein said storage section stores data related to an area of each of said plurality of kinds of patterns contained in said image, and said first area is determined based on data related to said areas stored in said storage section.

4. A pattern identification apparatus for identifying a predetermined pattern contained in an image, said apparatus comprising:
  a storage section in which data related to said predetermined pattern is stored;
  a first collation section for making comparison and collation between data related to an image in a first area greater than an area of said predetermined pattern in said image and said data related to said predetermined pattern;
  a cutting section for cutting out a second area smaller than said first area from said first area based on the result of comparison carried out by said first collation section;
  a second collation section for making comparison and collation between data related to an image in said second area and said data related to said predetermined pattern; and
  an identification section for identifying said predetermined pattern contained in said image based on the result of comparison carried out by said second collation section,
  wherein said data related to said predetermined pattern stored in said storage section comprises characteristic data representative of horizontal and vertical characteristics in said predetermined pattern, said first collation section comprises a first conversion section for converting image data in said first area into characteristic data representative of horizontal and vertical characteristics, and compares and collates said characteristic data converted by said first conversion section with said characteristic data of said predetermined pattern, and said second collation section comprises a second conversion section for converting image data in said second area into characteristic data representative of horizontal and vertical characteristics, and compares and collates said characteristic data converted by said second conversion section with said characteristic data of said predetermined pattern.

5. The pattern identification apparatus according to claim 4, wherein said characteristic data obtained by said first and second conversion sections are normalized.

6. The pattern identification apparatus according to claim 4, wherein said storage section stores a plurality of kinds of different patterns as patterns to be identified.

7. The pattern identification apparatus according to claim 6, wherein said storage section stores data related to an area of each of said plurality of kinds of patterns contained in said image, and said first area is determined based on data related to said areas stored in said storage section.

8. A pattern identification apparatus for identifying a predetermined pattern contained in an image, said apparatus comprising:
  a storage section in which data related to said predetermined pattern is stored;
  a first cutting section for cutting out a first area greater than said predetermined pattern area from said image;
  a first collation section for making comparison and collation between data related to an image in said first area and said data related to said predetermined pattern;
  a second cutting section for cutting out a second area smaller than said first area from said first area based on the result of comparison carried out by said first collation section;
  a second collation section for making comparison and collation between data related to an image in said second area and said data related to said predetermined pattern; and
  an identification section for identifying said predetermined pattern contained in said image based on the result of comparison carried out by said second collation section,
  wherein said first collation section carries out comparison and collation while shifting said predetermined pattern relative to said image in said first area one unit area by one unit area which constitutes data related to said image, thereby to calculate a difference level between said image in said first area and said predetermined pattern, and said second culling section cuts out said second area based on an amount of shift of said predetermined pattern relative to said image in said first area at the time when said difference level meets a predetermined requirement.

9. The pattern identification apparatus according to claim 8, wherein said storage section stores a plurality of kinds of different patterns as patterns to be identified.

10. The pattern identification apparatus according to claim 9, wherein said storage section stores data related to an area of each of said plurality of kinds of patterns contained in said image, and said first area is determined based on data related to said areas stored in said storage section.

11. A pattern identification apparatus for identifying a predetermined pattern contained in an image, said apparatus comprising:
  a storage section in which data related to said predetermined pattern is stored;
  a first cutting section for cutting out a first area greater than said predetermined pattern area from said image;
  a first collation section for making comparison and collation between data related to an image in said first area and said data related to said predetermined pattern;
  a second cutting section for cutting out a second area smaller than said first area from said first area based on the result of comparison carried out by said first collation section;
  a second collation section for making comparison and collation between data related to an image in said second area and said data related to said predetermined pattern; and
  an identification section for identifying said predetermined pattern contained in said image based on the result of comparison carried out by said second collation section,
  wherein said data related to said predetermined pattern stored in said storage section comprises characteristic data representative of horizontal and vertical characteristics in said predetermined pattern, said first collation section comprises a first conversion section for converting image data in said first area into characteristic data representative of horizontal and vertical characteristics, and compares and collates said characteristic data converted by said first conversion section with said characteristic data of said predetermined pattern, and said second collation section comprises a second conversion section for converting image data in said second area into characteristic data representative of horizontal and vertical characteristics, and compares and collates said characteristic data converted by said second conversion section with said characteristic data of said predetermined pattern.

12. The pattern identification apparatus according to claim 11, wherein said characteristic data obtained by said first and second conversion sections are normalized.

13. The pattern identification apparatus according to claim 11, wherein said storage section stores a plurality of kinds of different patterns as patterns to be identified.

14. The pattern identification apparatus according to claim 13, wherein said storage section stores data related to an area of each of said plurality of kinds of patterns contained in said image, and said first area is determined based on data related to said areas stored in said storage section.

15. A pattern identification method for identifying a predetermined pattern contained in an image, said method comprising:
    storing data related to said predetermined pattern in a storage section;
    comparing and collating, by a first collation section, between data related to an image in a first area greater than an area of said predetermined pattern in said image and said data related to said predetermined pattern;
    cutting out a second area smaller than said first area from said first area based on the result of comparison carried out by said first collation section;
    comparing and collating, by a second collation section, between data related to an image in said second area and said data related to said predetermined pattern;
    identifying said predetermined pattern contained in said image based on the result of comparison carried out by said second collation section;
    comparing and collating, by said first collation section, while shifting said predetermined pattern relative to said image in said first area one unit area by one unit area which constitutes data related to said image, thereby to calculate a difference level between said image in said first area and said predetermined pattern; and
    cutting out said second area based on an amount of shift of said predetermined pattern relative to said image in said first area at the time when said difference level meets a predetermined requirement.

16. A pattern identification method for identifying a predetermined pattern contained in an image, said method comprising:
    storing data related to said predetermined pattern in a storage section;
    comparing and collating, by a first collation section, between data related to an image in a first area greater than an area of said predetermined pattern in said image and said data related to said predetermined pattern;
    cutting out a second area smaller than said first area from said first area based on the result of comparison carried out by said first collation section;
    comparing and collating, by a second collation section, between data related to an image in said second area and said data related to said predetermined pattern;
    identifying said predetermined pattern contained in said image based on the result of comparison carried out by said second collation section;
    wherein said data related to said predetermined pattern stored in said storage section comprises characteristic data representative of horizontal and vertical characteristics in said predetermined pattern, said first collation section comprises a first conversion section for converting image data in said first area into characteristic data representative of horizontal and vertical characteristics, and compares and collates said characteristic data converted by said first conversion section with said characteristic data of said predetermined pattern, and said second collation section comprises a second conversion section for converting image data in said second area into characteristic data representative of horizontal and vertical characteristics, and compares and collates said characteristic data converted by said second conversion section with said characteristic data of said predetermined pattern.

* * * * *